(12) United States Patent
Kim et al.

(10) Patent No.: US 10,547,093 B2
(45) Date of Patent: Jan. 28, 2020

(54) BATTERY PACK

(71) Applicant: LG ELECTRONICS INC., Seoul (KR)

(72) Inventors: Taejin Kim, Seoul (KR); Sanghun Yoon, Seoul (KR); Sanghyun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 122 days.

(21) Appl. No.: 15/121,404

(22) PCT Filed: Feb. 24, 2015

(86) PCT No.: PCT/KR2015/001738
§ 371 (c)(1),
(2) Date: Aug. 25, 2016

(87) PCT Pub. No.: WO2015/130056
PCT Pub. Date: Sep. 3, 2015

(65) Prior Publication Data
US 2016/0372805 A1    Dec. 22, 2016

(30) Foreign Application Priority Data

Feb. 25, 2014 (KR) .................. 10-2014-0022087

(51) Int. Cl.
*H01M 10/6568* (2014.01)
*H01M 10/6556* (2014.01)
*H01M 2/10* (2006.01)
*H01M 10/613* (2014.01)
*H01M 10/625* (2014.01)

(52) U.S. Cl.
CPC ..... *H01M 10/6568* (2015.04); *H01M 2/1077* (2013.01); *H01M 10/613* (2015.04); *H01M 10/625* (2015.04); *H01M 10/6556* (2015.04); *H01M 2220/20* (2013.01)

(58) Field of Classification Search
CPC .......... H01M 10/625; H01M 10/6568; H01M 10/613; H01M 10/6556; H01M 2/1077
See application file for complete search history.

(56) References Cited

U.S. PATENT DOCUMENTS 4,982,785 A * 1/1991 Tomlinson ............. F24H 3/105
126/110 R
9,531,045 B2 * 12/2016 Girmscheid ........ H01M 10/625
(Continued)

FOREIGN PATENT DOCUMENTS

JP    2004221315 A  *  8/2004
JP    2007-299637       11/2007
(Continued)

OTHER PUBLICATIONS

International Search Report dated Jun. 19, 2015 for PCT Application No. PCT/KR2015/001738, 4 pages.

*Primary Examiner* — Jonathan G Jelsma
(74) *Attorney, Agent, or Firm* — Fish & Richardson P.C.

(57) ABSTRACT

The present invention relates to a battery pack. A battery pack according to an embodiment of the present invention includes: a cell module including a cell for generating electric energy; a heat sink in which cooling water for absorbing heat energy generated in the cell module flows; and a vortex flow forming unit disposed in the heat sink to form a vortex flow.

12 Claims, 7 Drawing Sheets

(56) References Cited

U.S. PATENT DOCUMENTS

| | | | | |
|---|---|---|---|---|
| 2007/0175617 A1* | 8/2007 | Brost | ............... | F02B 29/0462 |
| | | | | 165/149 |
| 2011/0300428 A1* | 12/2011 | Sohn | ............... | H01M 2/1066 |
| | | | | 429/120 |
| 2015/0140388 A1* | 5/2015 | Harada | ............... | H01M 10/617 |
| | | | | 429/120 |
| 2015/0244044 A1* | 8/2015 | Boddakayala | ............... | B60L 11/14 |
| | | | | 429/120 |

FOREIGN PATENT DOCUMENTS

| | | | | |
|---|---|---|---|---|
| JP | 2011-049138 | 3/2011 | | |
| JP | 2011-253734 | 12/2011 | | |
| KR | 10-2011-0132793 | 12/2011 | | |
| WO | WO-2013171885 A1 * | 11/2013 | ............... | H01M 10/617 |

* cited by examiner

BATTERY PACK

CROSS REFERENCE TO RELATED APPLICATIONS

This application is a U.S. National Phase Application under 35 U.S.C. § 371 of International Application PCT/KR2015/001738, filed on Feb. 24, 2015, which claims the benefit of Korean Application No. 10-2014-0022087, filed on Feb. 25, 2014, the entire contents of which are hereby incorporated by reference in their entireties.

TECHNICAL FIELD

The present invention relates to a battery pack and, more particularly, to a battery pack including a heat sink having improved cooling efficiency.

BACKGROUND ART

An electric vehicle uses a driving motor which acquires driving power by receiving electricity from a battery and exhausts less carbon dioxide as compared to an engine acquiring driving power using fossil fuels, such as gasoline or diesel, thus being spotlighted as an eco-friendly vehicle. Recently, rising oil prices and reinforcement of exhaust gas regulations have increased the speed of electric vehicle development and the market scale thereof is rapidly expanding.

However, in order to achieve high efficiency of an electric vehicle, the electric vehicle should have a light weight and a compact size and, thus, a method of effectively cooling the inside of a compact battery is required.

DISCLOSURE

Technical Problem

Therefore, the present invention has been made in view of the above problems, and it is an object of the present invention to increase heat exchange efficiency of cooling water.

It is another object of the present invention to provide a water cooling-type cooling device which is easily manufactured and has a simple structure.

Additional advantages, objects, and features of the invention will be set forth in part in the description which follows and in part will become apparent to those skilled in the art upon examination of the following or may be learned from practice of the invention.

Technical Solution

In accordance with an aspect of the present invention, the above and other objects can be accomplished by the provision of a battery pack including cell modules including cells to generate electric energy, heat sinks configured to absorb thermal energy generated from the cell modules, cooling water flowing in the heat sinks, and vortex forming parts disposed in the heat sinks to form vortexes.

The heat sink may form a plurality of main paths to guide cooling water in the width direction of the vehicle and connection paths extending in the forward and backward directions of a vehicle to interconnect the main paths, and the vortex forming parts may be provided in plural number and formed in the connection paths or the main paths.

The vortex forming parts provided in plural number may be formed in the main paths, and the numbers of the vortex forming parts formed in the respective main paths may be the same.

The vortex forming parts and the heat sinks may be formed integrally by pressing or stamping a metal plate.

The heat sink may include a first cooling plate contacting the cell modules and absorbing thermal energy and a second cooling plate combined with the first cooling plate to form a flow path, and the first cooling plate and the second cooling plate may be joined to each other by a brazing method.

The battery pack may further include thermal pads configured to transfer thermal energy of the cell modules to the heat sinks.

The vortex forming parts may include at least two kinds of vortex forming parts having different transversal lengths, longitudinal lengths or heights.

Water inlet ports of the heat sinks to introduce cooling water thereinto and water outlet ports of the heat sinks to discharge cooling water therefrom may be connected in series so as to form one flow path.

The water inlet ports of the heat sinks to introduce cooling water thereinto and the water outlet ports of the heat sinks to discharge cooling water therefrom may be connected in parallel so as to form a plurality of flow paths.

A ratio of the length W of the vortex forming parts in the forward and backward directions based on the main flow direction of cooling water to the protruding height H of the vortex forming parts may be 2.5:1 or less.

The heat sink may include a first cooling plate contacting the cell modules and absorbing thermal energy and a second cooling plate combined with the first cooling plate to form a flow path, the vortex forming parts may include first vortex forming parts formed on the first cooling plate and second vortex forming parts formed on the second cooling plate, and one of the first vortex forming parts and the second vortex forming parts may be disposed at the rear of the other of the first vortex forming parts and the second vortex forming parts in the flow direction of cooling water.

The heat sink may include a first cooling plate contacting the cell modules and absorbing thermal energy and a second cooling plate combined with the first cooling plate to form a flow path, and a ratio of a protruding height of the vortex forming parts to an interval D between the first cooling plate and the second cooling plate may be 0.7:1 or less.

Separation intervals between the vortex forming parts may be different according to the positions thereof, and the vortex forming parts may be disposed so as to be inclined in an oblique direction with respect to the main flow direction of cooling water.

The heat sink may include a first cooling plate contacting the cell modules and absorbing thermal energy and a second cooling plate combined with the first cooling plate to form a flow path, and the vortex forming parts may protrude from the first cooling plate to guide cooling water, flowing along the first cooling plate, to the second cooling plate, and protrude from the second cooling plate to guide cooling water, flowing along the second cooling plate, to the first cooling plate. The heat sink may include a first cooling plate contacting the cell modules and absorbing thermal energy and a second cooling plate combined with the first cooling plate to form a flow path, and the vortex forming parts may include first vortex forming parts formed on the first cooling plate and third vortex forming parts disposed on the second cooling plate so as to be symmetrical to the first vortex forming parts.

The details of other aspects are included in the following detailed description and the drawings.

Advantageous Effects

A battery pack in accordance with the embodiments of the present invention may have one or more effects described below.

First, the flow direction and flow velocity of cooling water are consistently changed and thus heat exchange efficiency is increased.

Second, the battery pack has a simple structure and is easily manufactured and repaired.

Third, a heat sink may be added according to the purpose or performance of a vehicle and thus design change is facilitated.

Effects of the present invention are not limited thereto, and other effects which are not stated herein will be readily understood by those skilled in the art from the claims.

BEST MODE

Figure 1:
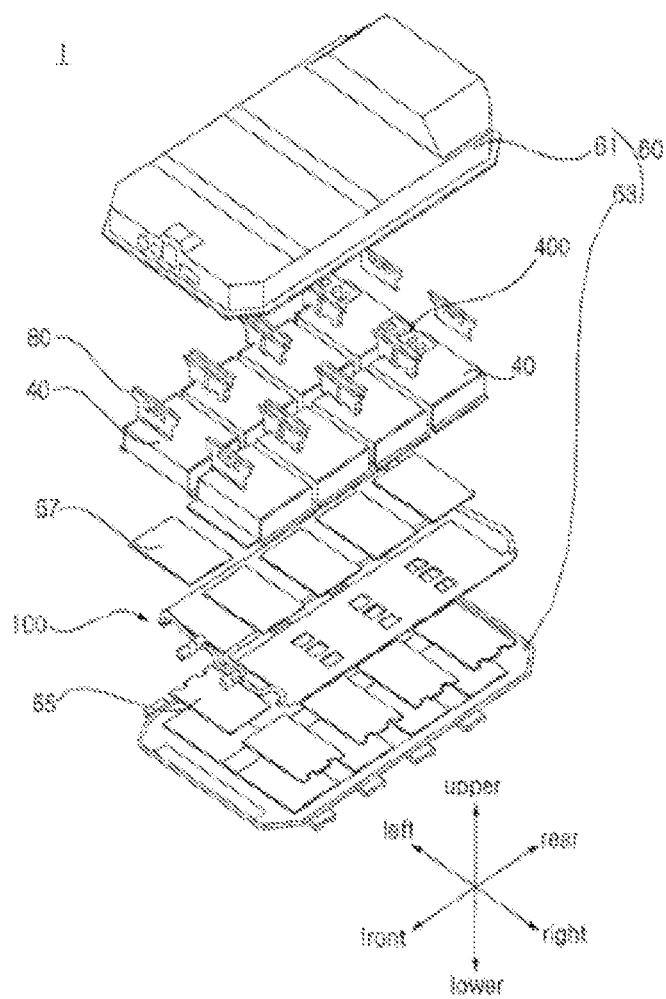
FIG. 1 is an exploded perspective view of a battery pack in accordance with one embodiment of the present invention.

The above and other objects, features and other advantages of the present invention will be more clearly understood from the following detailed embodiments taken in conjunction with the accompanying drawings. However, while the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims. Throughout the specification, the same or similar elements are denoted by the same reference numerals even though they are depicted in different drawings.

Figure 2:
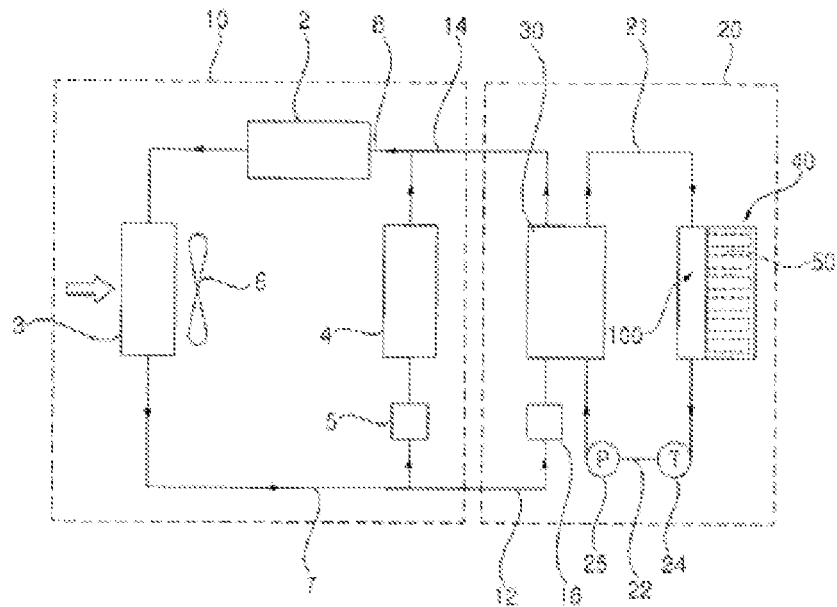
FIG. 2 is a block diagram showing relations between an air conditioner and a heat sink in accordance with one embodiment of the present invention
Figure 3:
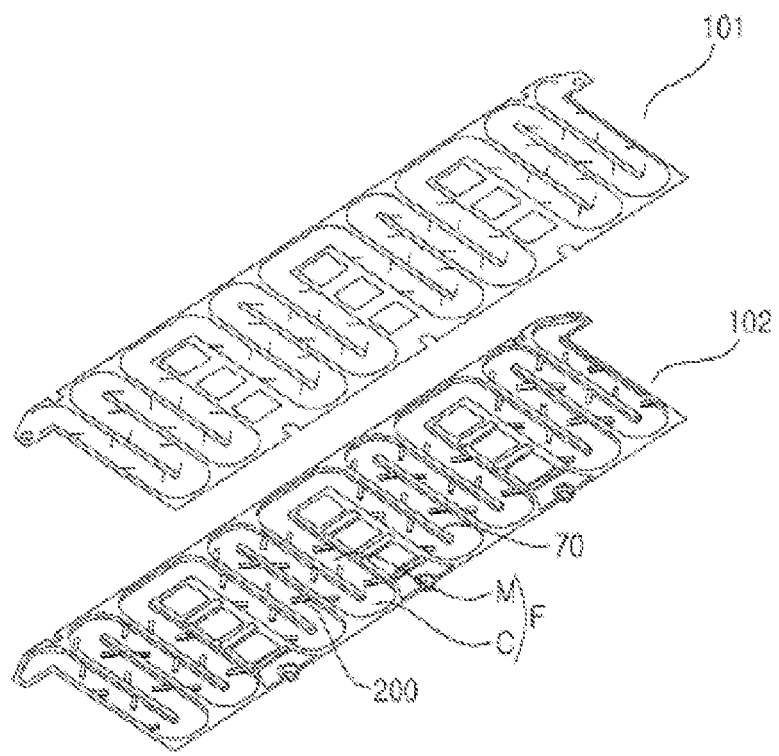
FIG. 3 is an exploded perspective view of a heat sink in accordance with one embodiment of the present invention.

Hereinafter, the present invention will be described with reference to the drawings to describe battery packs in accordance with embodiments of the present invention. FIG. 1 is an exploded perspective view of a battery pack in accordance with one embodiment of the present invention. FIG. 2 is a block diagram showing relations between an air conditioner and a heat sink in accordance with one embodiment of the present invention. FIG. 3 is an exploded perspective view of a heat sink in accordance with one embodiment of the present invention.

With reference to FIGS. 1 to 3, a battery pack in accordance with one embodiment of the present invention includes cell modules 40 including cells to generate electric energy, heat sinks 100 to absorb thermal energy generated from the cell modules 40, cooling water flowing in the heat sinks 100, and vortex forming parts 200 disposed within the heat sinks 100 to form vortexes.

The battery pack includes a casing 60 forming the external shape of the battery pack and a plurality of cell modules 40 provided within the casing 60.

The casing 60 includes a tray 63 to support load of the cell modules 40 and a cover 61 combined with the tray 63 to cover the cell modules 40. Support panels 65 reinforce stiffness of the tray 63 and uniformly distribute load of the heat sinks 100 to the tray 63.

The battery pack is located at the central part of the bottom of a vehicle frame. The battery pack is disposed between a front rotary shaft and a rear rotary shaft. The bottom of the vehicle frame is disposed under a passenger compartment. Within the passenger compartment, an instrument panel, a central console box, and seats are disposed. The battery pack is disposed at the outside of the passenger compartment under the bottom of the vehicle frame. The battery pack corresponds to a fuel tank of a vehicle including an internal combustion engine and repeats charge to increase a battery capacity and discharge to decrease the battery capacity. The battery pack generates heat during charge and discharge.

The battery pack includes an inverter and a DC-DC converter. The inverter converts DC power of the battery pack into 3-phase AC power and then supplies the converted 3-phase AC power to a motor. The DC-DC converter drops voltage of DC power of the battery pack and supplies the DC power having dropped voltage to electric devices, etc. Cooling water flowing in the heat sink 100 absorbs thermal energy from the cell modules 40. The heat sink constitutes a part of a temperature adjustment module.

A cooling device 10 may cool the passenger compartment. The cooling device 10 includes a compressor 2, a condenser 3, an evaporator 4, a first expansion valve 5, an air blower fan 6, and first and second refrigerant paths 7 and 8. The first refrigerant path 7 connects the condenser 3 and the expansion device 5. The second refrigerant path 8 connects the evaporator 4 and the compressor 2. A bypass path 12 to divert at least a part of the refrigerant condensed by the condenser 3 to a cooler 30, which will be described later, is connected to the first refrigerant path 7. A second expansion valve 16 is installed on the bypass path 12. A cooler discharge path 14 to guide the refrigerant having passed through the cooler 30 is connected to the second refrigerant path 8.

The temperature adjustment module 20 includes the cooler 30, cooling water paths 21 and 22, a cooling water tank 24, a cooling water pump 25, and the cooling water flow part heat sink 100 combined with the cell modules 40. The cooler 30 is a device to execute heat exchange between the refrigerant diverted to the first bypass path 12 and the cooling water. Heat absorbed by the cooling water flow part heat sink 100 is discharged through the cooler 30. The cooling water tank 24 is a reservoir to store cooling water to remove gas from a cooling path at the front end of the cooler 30 and to supplement cooling water.

The vortex forming parts 200 disturb the flow of cooling water to form vortexes. A vortex (or an eddy) is a movement in a part of cooling water which spins round in a direction opposite to the main flow of the cooling water. The vortex forming parts 200 may be obstacles to disturb the flow of cooling water. Cooling water at the rear of the vortex forming parts 200 forms vortexes. The vortexes may be formed while contacting the vortex forming parts 200 and the heat sink 100.

The heat sink 100 forms a plurality of main paths M to guide cooling water in the width direction of the vehicle, and connection paths C extending in the forward and backward directions of the vehicle to interconnect the main paths M.

A plurality of vortex forming parts 200 is formed in the connection paths C or the main paths M. The main paths M are formed in the leftward and rightward directions. One main path M is connected to another main path M through a connection path C. A plurality of main paths M is formed. The connection paths C are formed in the forward and backward directions of the vehicle and thus interconnect at least two main paths M. The connection paths C interconnect three or more main paths M.

The main paths M and connection paths C are formed by diaphragms 70. The diaphragms 70 are disposed within the heat sink 100. An inner flow path F includes the main paths M and the connection paths C. Inner flow paths F in accordance with a plurality of embodiments may be formed. The inner flow path F may be formed in a continuous form. In this case, the connection paths C may be formed in a U-shape. Further, one connection path C is connected to two main paths M.

A connection path C formed at one side may supply cooling water to a main path M, and a connection path C formed at the other side may receive cooling water. That is, a connection path C formed at one side supplies cooling water to a connection path C formed at the other side through the main path M connected thereto. A plurality of vortex forming parts 200 may be formed on at least one of the connection paths C and the main paths M. The vortex forming parts 200 are disposed under the cell modules 40. A plurality of vortex forming parts 200 may be formed on the main paths M, and the numbers of the vortex forming parts 200 formed on the respective main paths M may be the same.

The numbers of the vortex forming parts 200 formed on the respective main paths M may be the same. However, the numbers of the vortex forming parts 200 formed on the main paths M may be increased as the main paths M are located away from a water inlet port 130 into which cooling water flows. Further, the numbers of the vortex forming parts 200 formed on the respective main paths M may be the same, but intervals between the vortex forming parts 200 formed on the main paths M may be different. The vortex forming parts 200 and the heat sinks 100 are formed integrally by pressing or stamping a metal plate.

Pressing includes shearing, bending, molding, drawing and compressing and thus includes any one of these processes or combination of a plurality of processes selected from the processes. Shearing is a method in which a material is cut by applying pressure exceeding rupture strength to the material using a shearing machine or a die. Bending is a method in which products of various shapes are manufactured by generating bending stress by applying force to a material such that tension and compression simultaneously act on a neutral plane of a board to be processed. Drawing is a method in which a metal plate or a material having high plasticity is put into a die to produce a seamless cup or container without wrinkles or cracks. Molding is a method in which a material is put into a space between upper and lower dies and pressure is applied thereto to produce a desired shape without intentional reduction of the thickness of the material and such molding is limited to a group having less material deformation. Stamping is a method in which a piece of a sheet metal is put into a space between upper and lower dies provided with prominences and depressions formed thereon and pressure is applied thereto to press shapes of the prominences and depressions on the surface of the sheet metal.

The heat sink 100 may be manufactured by respectively forming a plurality of metal plates and then welding the metal plates to one another. The heat sink 100 in accordance with one embodiment of the present invention includes a first cooling plate 101 contacting the cell modules 40 and absorbing thermal energy and a second cooling plate 102 combined with the first cooling plate 101 to form a flow path, and the first cooling plate 101 and the second cooling plate 102 are joined to each other by a brazing method. The first cooling plate 101 and the second cooling plate 102 may be referred to as an upper plate and a lower plate, and any one of the first cooling plate 101 and the second cooling plate 102 contacts the cell modules 40 and thus absorbs thermal energy. Cooling water absorbs thermal energy from any one of the first cooling plate 101 and the second cooling plate 102.

Brazing which is a kind of soldering is a method in which molten lead flows into base materials and thus the base materials are joined without melting of the base materials. There are brazing in which a material having a melting point of higher than a temperature of 450° C. is used and soldering in which a material having a melting point of lower than the temperature is used. In vehicle body repair, brazing is used to fill up a stepwise structure at a panel joint or to attach a thin plate serving as a clamp base during pull-up operation.

The battery pack in accordance with one embodiment of the present invention includes thermal pads 67 to transmit thermal energy of the cell modules 40 to the heat sink 100. The thermal pads 67 are thermally conductive pads. The thermal pads 67 are formed of a material having high thermal conductivity. The thermal pads 67 serve to fill gaps between the cell modules 40 and the heat sink 100 and thus increase a heat transfer area therebetween. The thermal pads 67 absorb thermal energy from the cell modules 40. The thermal pads 67 transfer thermal energy to the heat sink 100. The heat sink 100 is formed of a material having a high heat transfer coefficient and cooling water flows within the heat sink 100.

At least two kinds of vortex forming parts 200 having different transversal lengths, longitudinal lengths or heights are formed. A plurality of kinds of vortex forming parts 200 is formed. The size and shape of vortexes vary according to the shape and size of the vortex forming parts 200. The size and shape of vortexes influence a heat transfer direction and a heat transfer rate. Therefore, a heat transfer degree to the heat sink 100 varies according to kinds of vortex forming parts 200.

Figure 4:
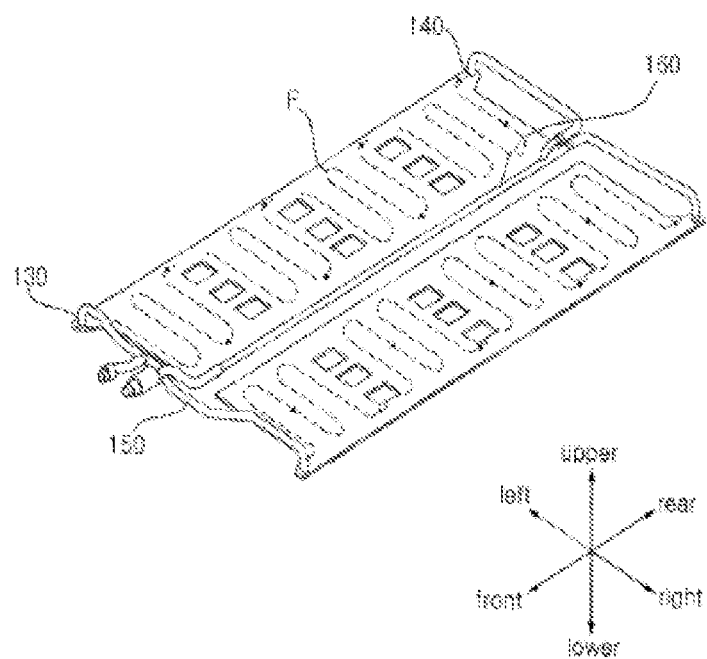
FIG. 4 is a perspective view of heat sinks.
Figure 5:
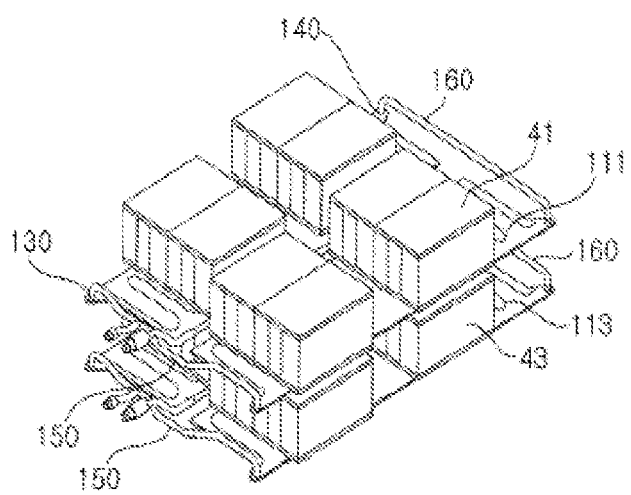
FIG. 5 is a view illustrating disposition relations between cell modules and heat sinks in accordance with one embodiment of the present invention.
Figure 6:
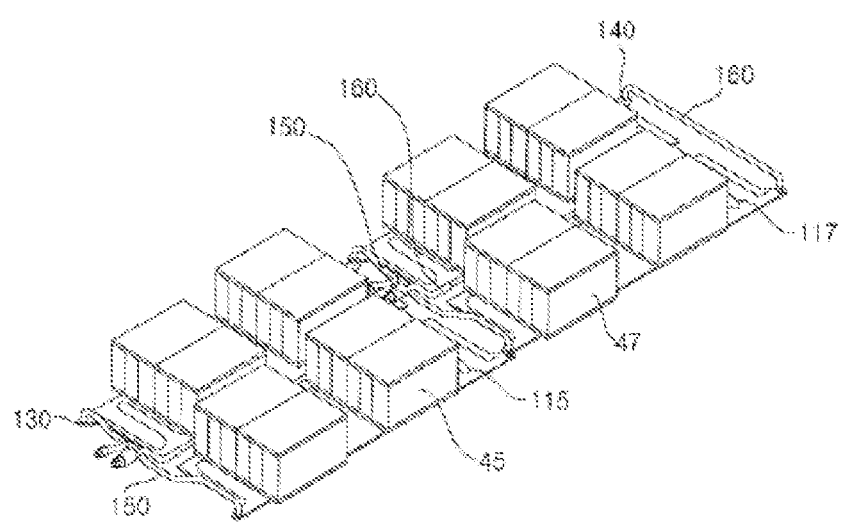
FIG. 6 is a view illustrating disposition relations between cell modules and heat sinks in accordance with another embodiment of the present invention.

FIG. 4 is a perspective view of the heat sinks 100. FIG. 5 is a view illustrating disposition relations between cell modules 40 and heat sinks 100 in accordance with one embodiment of the present invention. FIG. 6 is a view illustrating disposition relations between cell modules 40 and heat sinks 100 in accordance with another embodiment of the present invention.

With reference to FIGS. 4 to 6, a plurality of heat sinks 100 is provided and the heat sinks 100 are connected in parallel. Each of the heat sinks 100 includes a water inlet port 130. Each water inlet port 130 is connected to a supply pipe 150. The supply pipe 150 is connected to the water inlet port 130 in parallel. The temperatures of cooling water introduced into the respective water inlet ports 130 may be the same. Each of the heat sinks 100 includes a water outlet port 140. Each water outlet port 140 is connected to a discharge pipe 160. The respective water outlet ports 140 are connected in series or in parallel by the discharge pipes 160.

As one example, with reference of FIG. 5, a plurality of heat sinks 100 may be disposed in the leftward and rightward directions and a plurality of heat sinks 100 may be disposed in the upward and downward directions. Supply pipes 150 are respectively connected to the heat sinks 100 disposed in the leftward and rightward directions in parallel. Further, the upper heat sinks 111 disposed in an upper area and the lower heat sinks 113 disposed in a lower area may be connected in parallel.

As another example, with reference to FIG. 6, a plurality of heat sinks 100 may be disposed in the leftward and rightward directions and a plurality of heat sinks 100 may be disposed in the forward and backward directions. Supply pipes 150 are respectively connected to the heat sinks 100 disposed in the leftward and rightward directions in parallel. Further, the front heat sinks 115 disposed in a front area and the rear heat sinks 117 disposed in a rear area may be connected in parallel by the supply pipes 150. Temperatures of cooling water introduced into the front heat sinks 115 and the rear heat sinks 117 may be the same.

Cooling water cooled by the cooling device 10 is transmitted to a plurality of heat sinks 100 by the supply pipes 150. The heat sinks 100 are connected in parallel by the supply pipes 150 and thus receive cooling water having the same temperature. Cooling water discharged from the heat sinks 100 flows toward the cooling device 10 through the discharge pipes 160.

In accordance with embodiments, a plurality of heat sinks 100 may be connected in series. As one example, cooling water discharged from the cooling device 10 may flow toward the lower heat sinks 113 via the upper heat sinks 111. As another example, cooling water discharged from the cooling device 10 may flow toward the rear heat sinks 117 via the front heat sinks 115.

The cell modules 40 include upper cell modules 41 disposed in a relatively upper area and lower cell modules 43 disposed in a lower area relative to the upper cell modules 41, the heat sinks 100 include lower heat sinks 113 absorbing thermal energy from the lower cell modules 43 and upper heat sinks 111 absorbing thermal energy from the upper cell modules 41, and water inlet ports 130 of the upper heat sinks 111 and the lower heat sinks 113, into which cooling water is introduced, are formed in the same direction. The cell modules 40 are disposed in the upward and downward directions.

The upper cell modules 41 are disposed in the upper area and the lower cell modules 43 are disposed in the lower area. The heat sinks 100 may be disposed in the upper and lower areas. The battery pack may include the upper cell modules 41, the upper heat sinks 111 disposed under the upper cell modules 41, the lower cell modules 43 disposed under the upper heat sinks 111, and the lower heat sinks 113 disposed under the lower cell modules 43.

The upper heat sinks 111 and the lower heat sinks 113 may be disposed such that the directions of the water inlet ports 130 thereof are the same. For example, the water inlet ports 130 may be disposed toward the front part of the vehicle, and the water outlet ports 140 may be disposed toward the rear part of the vehicle. Such a disposition may be useful if the length of the vehicle in the forward and backward directions is short. The cell modules 40 include cells which are secondary batteries (lithium ion batteries, etc.). The cell modules 40 include a plurality of thin plate-shaped cells.

The cells are stacked and electrically connected in series. A plurality of cell modules 40 is electrically connected in series. The cell module 40 has an assembly structure in which a plurality of cells is vertically stacked. The cell module 40 has a structure in which a plurality of cells is disposed in parallel in the thickness direction. The cell module 40 is formed by disposing a plurality of cells in parallel in the horizontal direction or the vertical direction. The cell modules 40 are spaced from each other, thus being divisionally disposed. The cell modules 40 are disposed bilaterally symmetrically with respect to the center of the vehicle.

The cell modules 40 may include front cell modules 45 disposed in a relatively front area and rear cell modules 47 disposed in a rear area relative to the front cell modules 45, the heat sinks 100 may include front heat sinks 115 absorbing thermal energy from the front cell modules 45 and rear heat sinks 117 absorbing thermal energy from the rear cell modules 47, and the front heat sinks 115 and the rear heat sinks 117 may receive cooling water in parallel with each other. A plurality of cell modules 40 may be disposed in the forward and backward directions. The front cell modules 45 are disposed in the front area and the rear cell modules 40 are disposed in the rear area. The heat sinks 100 may be disposed in the front and the rear areas.

The battery pack may include the front cell modules 45, the front heat sinks 115 disposed under the front cell modules 45, the rear cell modules 47 disposed at the rear of the front cell modules 45, and the rear heat sinks 117 disposed under the rear cell modules 47. The front heat sinks 115 and the rear heat sinks 117 may be disposed at the same height. Cooling water discharged from the water outlet ports 140 of the front heat sinks 115 may be introduced into the water inlet ports 130 of the rear heat sinks 117.

The water outlet ports 140 of the front heat sinks 115 and the water inlet ports 130 of the rear heat sinks 117 may communicate with each other. Such a disposition increases the capacity of the passenger compartment of the vehicle. Further, the height of the vehicle may be lowered and thus driving stability is increased. If the front heat sinks 115 and the rear heat sinks 117 are connected in series, the configuration of the battery pack is simplified. If the front heat sinks 115 and the rear heat sinks 117 are connected in parallel, cooling water having the same temperature may be respectively introduced thereto and thus temperature management is effective.

Figure 7:
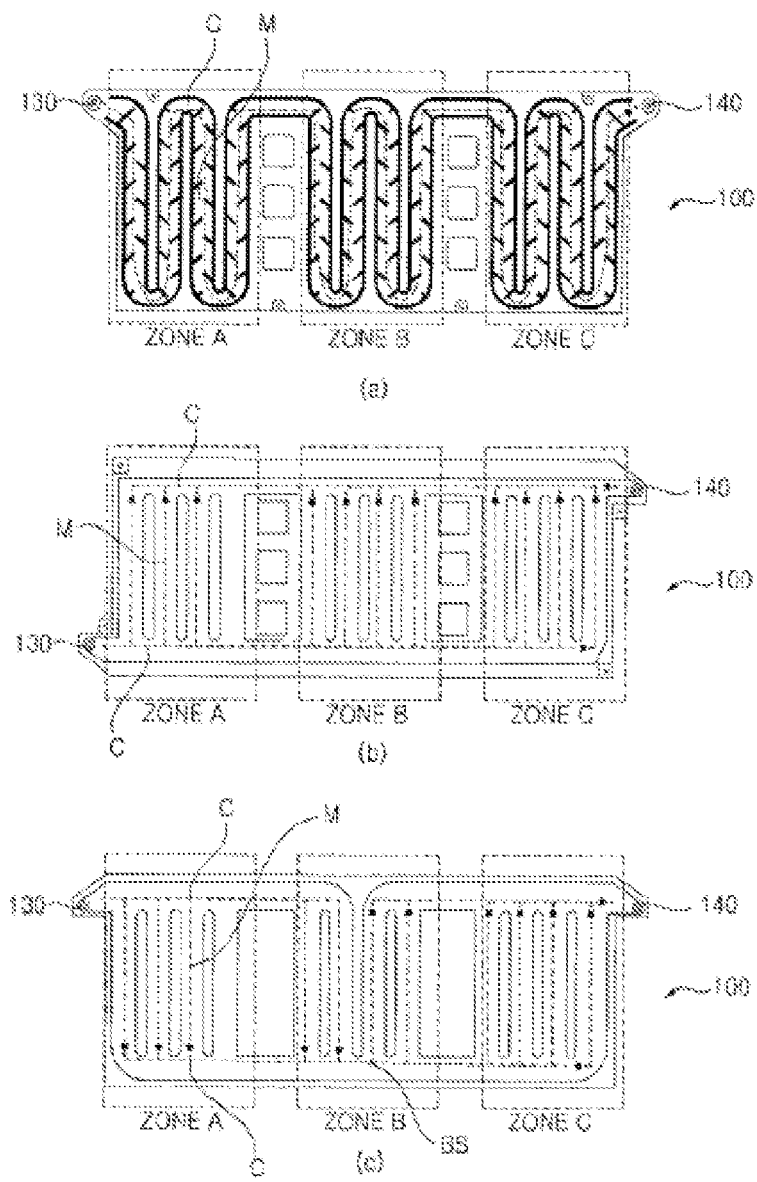
FIG. 7 illustrates heat sinks in accordance with various embodiments.
Figure 8:
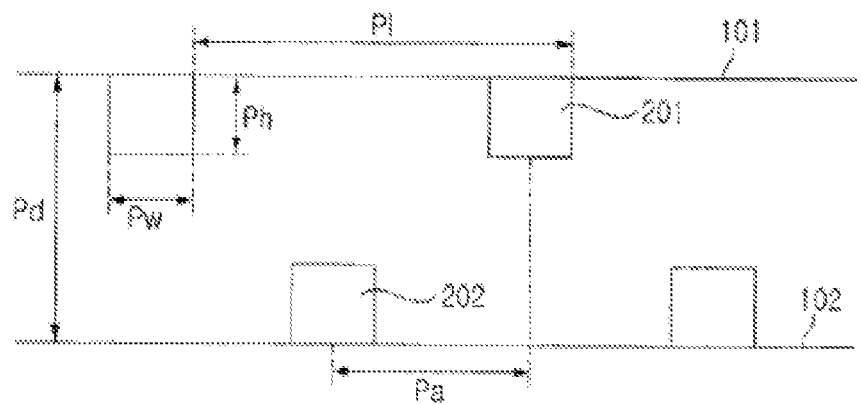
FIG. 8 is a longitudinal-sectional view of a heat sink.
Figure 9:
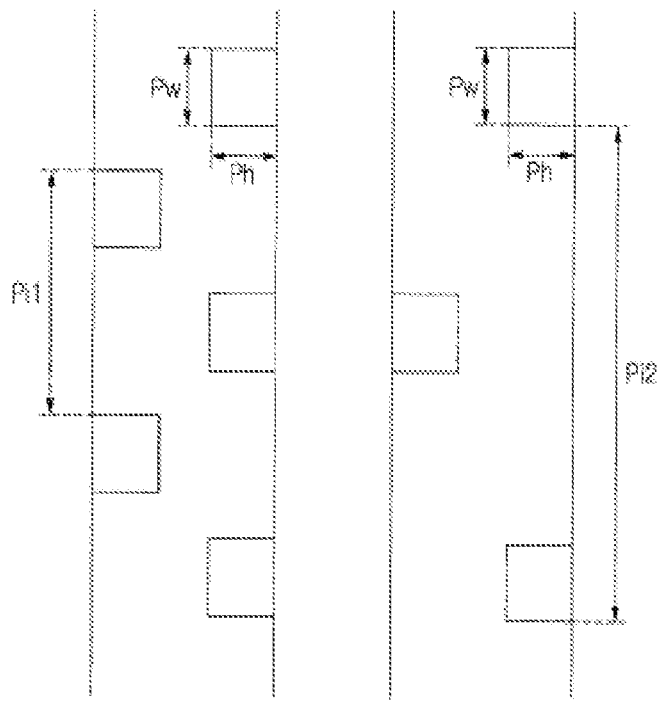
FIG. 9 is a longitudinal-sectional view of the heat sink shown in FIG. 8 according to zones.

FIG. 7 illustrates heat sinks in accordance with various embodiments. FIG. 8 is a longitudinal-sectional view of a heat sink. FIG. 9 is a longitudinal-sectional view of the heat sink shown in FIG. 8 according to zones.

With reference to FIG. 7(a), in heat sinks 100, water inlet ports 130 into which cooling water is introduced and water outlet ports 140 from which cooling water is discharged may be connected in series so as to form one flow path. A plurality of main paths M and a plurality of connection paths C are formed between the water inlet ports 130 and the water outlet ports 140. The main paths M are formed in the width direction of the vehicle and the connection paths C interconnect the main paths M. In order to increase the cross-sectional area of the flow path, the main paths M are formed parallel to one another. The connection paths C are formed in a U shape so as to interconnect the main paths M.

With reference to FIG. 7(b), in heat sinks 100, water inlet ports 130 into which cooling water is introduced and water outlet ports 140 from which cooling water is discharged may be connected in parallel so as to form a plurality of flow paths. If the water inlet ports 130 and the water outlet ports 140 are connected in parallel, the connection path C may interconnect at least 3 main paths M. At least two connection paths C are formed. The connection paths C are formed parallel to one another. The connection paths C are formed in a straight line and, in order to increase the area of the flow path, the connection path C and the main paths M are formed at a right angle.

In the case of connection in parallel, the temperature of the cell modules 40 may be more uniformly controlled. In the case of connection in series, only one cooling water flow path is formed and thus a cooling water temperature difference between the front area and the rear area may be greatly increased. Therefore, the temperature of the cell modules 40 disposed around the water inlet port 130 may be excessively lowered but it may be difficult to cool the cell modules 40 disposed around the water outlet port 140. Consequently, it may take a long time to cool the cell modules 40 disposed in the rear area, and energy efficiency may be lowered due to supply of cooling water of an excessively low temperature. However, in the case of connection in parallel, a plurality of flow paths is directed to the water outlet port 140 and thus a temperature difference width of cooling water is reduced, as compared to connection in series. Therefore, cooling water of a comparatively low temperature may be supplied to the cell modules 40 disposed in the rear area and, thus, heat transfer efficiency is increased, rapid cooling is facilitated and energy efficiency is increased.

With reference to FIG. 7(c), a zone B forms a place at which a zone A and a zone B are connected. The zone B forms a bottleneck point BS at which a plurality of connection paths C is joined. The bottleneck point BS is formed between two left main paths M and two right main paths M of the zone B. At the bottleneck point BS, some connection paths C may be cut off. The connection path C disposed at the upper side is cut off in the zone B and then formed again via the bottleneck point BS.

A ratio of the length W of the vortex forming parts 200 in the forward and backward directions based on the main flow direction of cooling water to the protruding height H of the vortex forming parts 200 may be 2.5:1 or less. The main flow direction of cooling water is a direction from the water inlet port 130 to the water outlet port 140. The water inlet port 130 is connected to the supply pipe 150 and the water outlet port 140 is connected to the discharge pipe 160. Cooling water prior to heat exchange with the cell modules 40 flows in the supply pipe 150. Cooling water after heat exchange with the cell modules 40 flows in the discharge pipe 160.

Pi indicates a distance between the vortex forming parts 200. Ph indicates the height of the vortex forming parts 200. Pw indicates the length of the vortex forming parts 200 in the forward and backward directions or the width of the vortex forming parts 200. Pd indicates a width between the first cooling plate 101 and the second cooling plate 102. Pa indicates a distance between a first vortex forming part 200 and a second vortex forming part 200. Pi1 is a distance between first type vortex forming parts 200. Pi2 indicates a distance between second type vortex forming parts 200. Experimentally, heat transfer efficiency may be increased if the relationship W/H<2.5 is satisfied. Within a designated range, as W/H becomes lower than 2.5, heat transfer efficiency is increased.

The heat sink 100 includes the first cooling plate 101 contacting the cell modules 40 and thus absorbing thermal energy and the second cooling plate 102 combined with the first cooling plate 101 to form a flow path, the vortex forming parts 200 include first vortex forming parts 201 formed on the first cooling plate 101 and second vortex forming parts 202 formed on the second cooling plate 102, and one of the first vortex forming parts 201 and the second vortex forming parts 202 is disposed at the rear of the other of the first vortex forming parts 201 and the second vortex forming parts 202 in the flow direction of cooling water.

The first vortex forming parts 201 and the second vortex forming parts 202 are alternately disposed. Preferably, the second vortex forming parts 202 are not formed at positions of the second cooling plate corresponding to the first vortex forming parts 201. The first vortex forming parts 201 and the second vortex forming parts 202 are disposed in zigzag. The interval between the first vortex forming parts 201 and the second vortex forming parts 202 may be the height of the flow path in which cooling water flows.

Preferably, Pa is not 0. That is, the first vortex forming parts 200 and the second vortex forming parts 200 preferably do not form a vertically symmetrical structure. The first vortex forming parts 200 and the second vortex forming parts 200 are alternately disposed. Experimentally, if the first vortex forming parts 200 and the second vortex forming parts 200 are alternately disposed, a pressure drop value is tripled, as compared to the case of a symmetrical structure, and thus heat transfer performance is increased.

The heat sink 100 may include the first cooling plate 101 contacting the cell modules 40 and thus absorbing thermal energy and the second cooling plate 102 combined with the first cooling plate 101 to form a flow path, and a ratio of a protruding height H of the vortex forming parts 200 to an interval D between the first cooling plate 101 and the second cooling plate 102 may be 0.7:1 or less. As H/D is increased, heat transfer efficiency is increased. However, if H/D is excessively increased, the cross-sectional area of the flow path is reduced and thus pressure loss occurs. Experimentally, H/D<0.7 is preferably maintained.

The vortex forming parts 200 may form the zone A, the zone B and the zone C of the heat sink 100 in which separation intervals between the vortex forming parts 200 may be different according to the positions thereof. The zone A, the zone B and the zone C are formed in one heat sink 100. In the zones A, B and C, different types of vortexes may be formed. In the zones A, B and C, the vortex forming parts 200 may be disposed as different types. For example, Pi1 formed by a first type and Pi2 formed by a second type may be different. The zone A may be an area in which the water inlet port 130 is formed. The zone C may be an area in which the water outlet port 140 is formed. The zone B may be formed between the zone A and the zone C. Experimentally, it may be shown that heat transfer efficiency is increased if the following relationship is satisfied.

$$Pi1:Pi2=1:2$$

Figure 10:
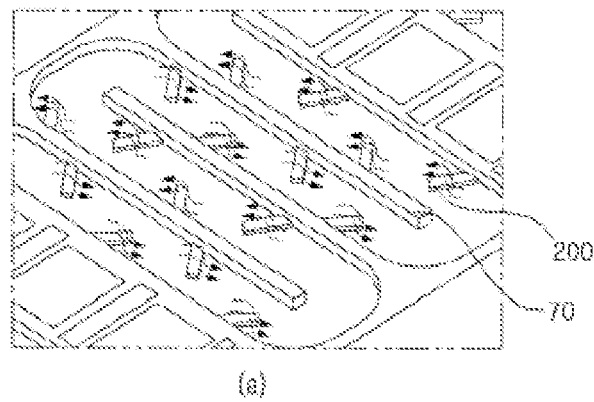
FIG. 10 is a view illustrating flow of cooling water flowing in a heat sink.
Figure 10:
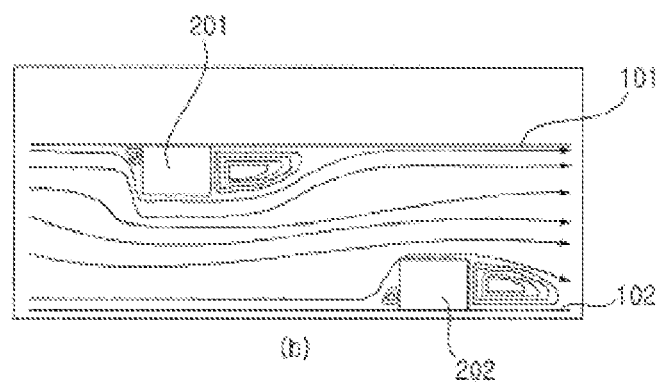

FIG. 10 is a view illustrating flow of cooling water flowing in a heat sink 100.

With reference to FIG. 10, the vortex forming parts 200 are inclined in an oblique direction with respect to the main flow direction of cooling water. The length direction of the vortex forming parts 200 is an oblique direction with respect to the main flow direction of cooling water. When the flow direction and the length direction are vertical to each other, flow resistance is increased. Further, when the flow direction and the length direction are parallel to each other, fewer vortexes are formed and heat transfer efficiency is reduced. The heat sink 100 may include the first cooling plate 101 contacting the cell modules 40 and thus absorbing thermal energy and the second cooling plate 102 combined with the first cooling plate 101 to form a flow path, and the vortex forming parts 200 may protrude from the first cooling plate 101 to guide cooling water, flowing along the first cooling plate 101, to the second cooling plate 102 and protrude from the second cooling plate 102 to guide cooling water, flowing along the second cooling plate 102, to the first cooling plate.

A part of cooling water colliding with the first vortex forming parts 200 formed on the first cooling plate 101 forms vortexes on the rear surfaces of the first vortex forming parts 200, and the other part of cooling water is directed toward the second cooling plate 102.

Figure 11:
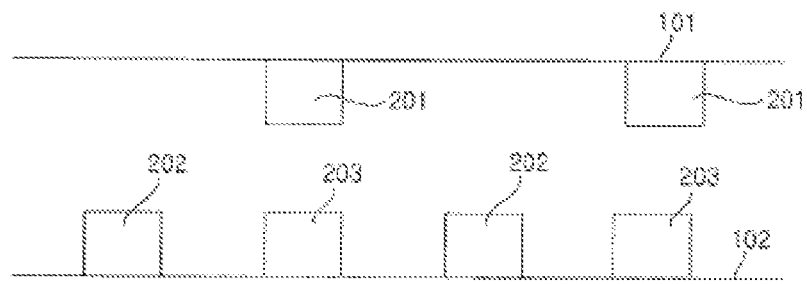
FIG. 11 is a view illustrating mutual disposition of vortex forming parts.

FIG. 11 is a view illustrating mutual disposition of the vortex forming parts.

With reference to FIG. 11, a heat sink 100 may include a first cooling plate 101 contacting cell modules 40 and thus absorbing thermal energy and a second cooling plate 102 combined with the first cooling plate 101 to form a flow path, and the first cooling plate 101 and the second cooling plate 102 may have at least some of the vortex forming parts 200 disposed in the same type as the above-described vortex forming parts 200 formed on the first cooling plate 101. The first cooling plate 101 and the second cooling plate 102 may be symmetrical to each other. The first cooling plate 101 and the second cooling plate 102 may have the same shape.

The heat sink 100 may include the first cooling plate 101 contacting the cell modules 40 and thus absorbing thermal energy and the second cooling plate 102 combined with the first cooling plate 101 to form a flow path, and the vortex forming parts 200 may include first vortex forming parts 201 formed on the first cooling plate 101 and third vortex forming parts 203 disposed on the second cooling plate 102 so as to be symmetrical to the first vortex forming parts 201. A plurality of vortex forming parts 200 may be disposed alternatively or disposed so as to be symmetrical to each other. The first vortex forming parts 201 and the third vortex forming parts 203 are disposed so as to be symmetrical to each other. The first vortex forming parts 201 and the second vortex forming parts 202 are alternately disposed. The first vortex forming parts 201 and the second vortex forming parts 202 are disposed in zigzag. The first vortex forming parts 201 and the third vortex forming parts 203 reduce the cross-sectional area of the flow path and thus lower pressure of cooling water.

Experimentally, if the vortex forming parts 200 are disposed so as to be symmetrical to each other, a pressure drop value is increased to 3 times or more, as compared to the case in that the vortex forming parts 200 are disposed alternately. Preferably, the first vortex forming parts 201 and the second vortex forming parts 202 are alternately disposed. If the vortex forming parts 200 are alternately disposed, formation of vortexes is promoted and thus heat transfer efficiency is increased.

Although the preferred embodiments of the present invention have been disclosed for illustrative purposes, these embodiments do not limit the technical scope and spirit of the invention. Those skilled in the art will appreciate that various modifications, additions and substitutions are possible, without departing from the scope and spirit of the invention as disclosed in the accompanying claims.

The invention claimed is:

1. A battery pack comprising:
   one or more cell modules that include cells that are configured to generate electric energy;
   one or more heat sinks that are configured to absorb thermal energy generated from the one or more cell modules, and cooling water that flows in the heat sinks; and
   vortex forming parts that are disposed in the heat sinks and that are configured to form vortexes,
   wherein the one or more heat sinks include:
     one or more diaphragms;
     a first cooling plate that is configured to contact the one or more cell modules, and that are configured to absorb thermal energy; and
     a second cooling plate that is configured to form a flow path in combination with the first cooling plate,
   wherein the vortex forming parts are formed in one or more paths,
   wherein the vortex forming parts include:
     first vortex forming parts that are formed on the first cooling plate; and
     second vortex forming parts that are disposed on the second cooling plate,
   wherein the first vortex forming parts are configured to protrude from the first cooling plate toward the second cooling plate, and the second vortex forming parts are configured to protrude from the second cooling plate toward the first cooling plate,
   wherein one of the first vortex forming parts and the second vortex forming parts are disposed at the rear of the other of the first vortex forming parts and the second vortex forming parts in a flow direction of cooling water, and
   wherein the first vortex forming parts and the second vortex forming parts are connected to the one or more diaphragms.

2. The battery pack according to claim 1, wherein:
   the one or more heat sinks form a plurality of main paths that are configured to guide cooling water in a first direction and one or more connection paths that extend in a second direction crossing the first direction to interconnect the plurality of main paths; and
   the vortex forming parts are provided in plural number and formed in the connection paths or the plurality of main paths.

3. The battery pack according to claim 2, wherein:
   the vortex forming parts provided in plural number are formed in the plurality of main paths; and
   the numbers of the vortex forming parts formed in the respective main paths are the same.

4. The battery pack according to claim 1, wherein:
   the one or more heat sinks are connected in parallel.

5. The battery pack according to claim 1, further comprising: thermal pads that are configured to transfer thermal energy of the one or more cell modules to the one or more heat sinks.

6. The battery pack according to claim 1, wherein the vortex forming parts includes at least two kinds of vortex forming parts with different transversal lengths, longitudinal lengths, and heights.

7. The battery pack according to claim 1, wherein water inlet ports of the one or more heat sinks are configured to introduce cooling water into the one or more heat sinks, water outlet ports of the one or more heat sinks are configured to discharge cooling water from the one or more heat sinks, and wherein the water inlets ports and the water outlet ports are connected in series to form one flow path.

8. The battery pack according to claim 1, wherein water inlet ports of the one or more heat sinks are configured to introduce cooling water into the one or more heat sinks, and water outlet ports of the one or more heat sinks are configured to discharge cooling water from the one or more heat sinks, and wherein the water inlets ports and the water are connected in parallel.

9. The battery pack according to claim 1, wherein a ratio of the length W of the vortex forming parts in the second direction based on the main flow direction of cooling water to the protruding height H of the vortex forming parts is 2.5:1 or less.

10. The battery pack according to claim 1, wherein a ratio of a protruding height of the vortex forming parts to an interval D between the first cooling plate and the second cooling plate is 0.7:1 or less.

11. The battery pack according to claim 1, wherein separation intervals between the vortex forming parts are different.

12. The battery pack according to claim 1, wherein the vortex forming parts are disposed to be inclined in an oblique direction with respect to the flow direction of cooling water.

* * * * *